United States Patent [19]

Hall

[11] 3,886,099

[45] May 27, 1975

[54] WATER SOLUBLE FLUX REMOVER
[75] Inventor: Robert M. Hall, Portland, Oreg.
[73] Assignee: Griffin Bros., Inc., Portland, Oreg.
[22] Filed: Nov. 12, 1973
[21] Appl. No.: 414,724

Related U.S. Application Data
[63] Continuation of Ser. No. 234,403, March 13, 1972, abandoned.

[52] U.S. Cl. .................. 252/548; 134/42; 252/153; 252/158; 252/542
[51] Int. Cl. ............................................. C11d 3/30
[58] Field of Search............ 252/158, 79.4, DIG. 10, 252/153, 548, 542; 134/42

[56] References Cited
UNITED STATES PATENTS
3,202,612  8/1965  Nelson .............................. 252/79.2
3,546,124  12/1970  Fleischer ........................... 252/153
3,679,609  7/1972  Castner .............................. 252/527

Primary Examiner—Herbert B. Guynn
Attorney, Agent, or Firm—Klarquist, Sparkman, Campbell, Leigh, Hall & Whinston

[57] ABSTRACT

A water soluble flux remover for removing soldering flux from electrical circuit boards and the like comprises a glycol ether, a saturated aliphatic amine, a surfactant, and a nonvolatile water soluble organic acid having a chelating radical. This composition has the ability to solublize rosin fluxes and the composition is biodegradable so that after removal of the fluxes the solution can be discharged into ordinary waste treatment systems.

9 Claims, No Drawings

WATER SOLUBLE FLUX REMOVER

CROSS REFERENCE TO RELATED APPLICATION

This application is a continuation of my copending application Ser. No. 234,403, filed Mar. 13, 1972, now abandoned.

BACKGROUND OF THE INVENTION

In the making of electrical circuit boards it has heretofore been the practice to remove fluxes by dipping the board first into a chlorinated solvent and then into a fluorinated solvent. The solvents themselves are expensive and the spent solvents must be disposed of with special processes because of their toxicity.

SUMMARY OF THE INVENTION

The water soluble flux remover of the present invention is effective in dissolving, saponifying, emulsifying and suspending a rosin flux in an aqueous solution so that it is prevented from redepositing. The components of the solution and the resulting reactants are all water soluble enabling free rinsing of the boards. All of the components are organic in nature and nonconductive and hence any residue which may remain on a board will not detract from the electrical properties thereof. Moreover, the solution does not remove identifying code bands on components or other markings and is noninjurious to the metals or components usually used in the electronics industry.

The solution of the invention comprises a composition including a glycol ether, a saturated aliphatic amine, a surfactant and a nonvolatile water soluble organic acid having a chelating radical, there being at least about three mols of amine present for each mol of organic acid.

DETAILED DESCRIPTION OF THE INVENTION

The glycol ether in the composition of the invention is present to act as a solvent for the rosin flux. In addition, it serves as a coupling agent and a foam depressant. Suitable glycol ethers include ethylene glycol mono methyl ether, ethylene glycol ethyl ether, ethylene glycol mono butyl ether (butyl cellosolve), diethylene glycol mono methyl ether, diethylene glycol mono ethyl ether, and diethylene glycol mono butyl ether and mixtures thereof. In addition, lower alcohols such as methyl alcohol, ethyl alcohol, isopropyl alcohol and the like may be added as flux solvents used to serve as coupling agents.

The organic acids are selected from the non-volatile organic acids having chelating abilities such as citric acid, gluconic acid and hydroxyacetic acid.

Suitable amines are those which will react with the rosin flux to form a soap and include the saturated aliphatic amines such as triethanol amine, diethanol amine, monoethanol amine, morpholine and the like. The amine should be present in substantial molar excess, there being at least about three mols amine present for each mol of organic acid and there preferably being at least about 5 mols amine present for each mol of organic acid.

The amine reacts with the rosin flux and makes a water soluble soap with the flux to facilitate its removal. In addition it functions as a corrosion inhibitor and a brightener of certain metals.

A surfactant is preferably present to lower the surface tension of the solution and facilitate penetration of the solvent into the flux. The surfactant also helps to emulsify and suspend the flux in solution and thereby aids in rinsing of the solution and dissolved materials from the circuit board. Suitable surfactants include polyoxyethylene surfactants such as alkylaryl polyether alcohol, modified polyethoxylated alcohol and the ethoxylates of some isomeric linear alcohols. Other of the conventional surfactants can also be used.

The organic acid serves as a buffer to reduce and maintain the alkalinity of the solution at a pH of between about 10.5 and 11.0. The acid preferably is selected so as to have the chelating ability thus to sequester oxides or metals present in the flux.

In addition to the foregoing components small amounts of a coloring agent or an antifoaming agent may be added.

The following table is illustrative of an embodiment of a cleansing solution which was effective for cleaning circuit boards:

| | |
|---|---|
| Butyl Cellosolve | 20.00 percent |
| Monoethanol amine | 20.00 percent |
| Surfactant | 1.00 percent |
| Isopropyl alcohol | 5.00 percent |
| Hydroxyacetic acid | 3.75 percent |
| Antifoaming agent | trace |
| Coloring agent | trace |
| Water | balance |

This solution was diluted in one instance in ratio of five parts solution to 95 parts water and in another in ratio of 15 parts solution to 85 parts water. Each was effective in removing rosin flux from circuit boards when washed at about 60° to 70°C. for 1 to 3 minutes and the boards thereafter rinsed with clear water.

Thus, when diluted for use in removing flux the preferred composition will preferably contain ingredients in the following proportions:

| | |
|---|---|
| butyl cellosolve | 1 to 3 percent |
| mono ethanolamine | 1 to 3 percent |
| surfactant | 0.05 to .15 percent |
| isopropyl alcohol | .25 to .75 percent |
| hydroxyacetic acid | .18 to .56 percent |
| water | balance. |

While the percentages of the ingredients may be varied somewhat, it is important that the amine-organic acid ratio be maintained between the limits indicated previously.

In preparing the solution the ingredients may be mixed in any order and they can be mixed as a concentrated solution containing about 50 percent water for further dilution prior to use.

To clean the circuit boards they may conveniently be placed in the conventional commercial type laboratory dishwasher and the cleaning solution and water added so as to obtain the desired ratio of components.

Washing is preferably carried out at a temperature of between 60° and 70°C., a wash cycle of about 1 to 3 minutes followed by a rinse cycle of about 8 minutes with clear water being effective in removing rosin fluxes without harm to the other components.

An advantage of the composition of the invention is that the solution permits a number of boards to be cleaned at the same time in an inexpensive washing apparatus and furthermore the wash water may be discharged into a normal sewage system because the components are biodegradable. The residue, as a result of the solution is freely rinsed from the board leaving a clean surface, although because of the organic nature of all of the components of the solution, if any film should remain on the board it will not be conductive and therefore will not interfere with the electrical function of the board.

I claim:

1. A water soluble solution for removing soldering flux from circuit boards consisting essentially of:
   a glycol ether selected from the group consisting of ethylene glycol mono methyl ether, ethylene glycol ethylether, ethylene glycol mono butyl ether, diethylene glycol mono methyl ether, diethylene glycol mono ethyl ether and diethylene glycol mono butyl ether and mixtures thereof;
   an amine selected from the group consisting of triethanol amine, diethanol amine, monoethanol amine and morpholine;
   an organic acid selected from the group consisting of citric acid, gluconic acid and hydroxyacetic acid, there being at least about 3 mols of said amine present for each mol of said organic acid;
   said glycol ether, amine and organic acid being dissolved in water to form a concentrate and being present in said concentrate in proportions which, upon dilution of said concentrate with water, will provide a washing solution containing by weight approximately 1 to 3% of said glycol ether, 1 to 3% of said amine and 0.18 to 0.56% of said acid.

2. A solution as set forth in claim 1 wherein said glycol ether is ethylene glycol mono butyl ether and is in substantially equal proportion to said amine by weight.

3. The solution of claim 1 in which said concentrate also contains a polyoxyethylene surfactant in an amount which will result in such washing solution containing approximately 0.05 to 0.15% by weight of said surfactant.

4. The solution of claim 1 in which said concentrate also contains a lower alcohol selected from the group consisting of methyl alcohol, ethyl alcohol and isopropyl alcohol in an amount which will result in said washing solution containing approximately 0.25 to 0.75% by weight of said alcohol.

5. The solution of claim 4 in which said concentrate also contains a polyoxyethylene surfactant in an amount which will result in said washing solution containing approximately 0.05 to 0.15% by weight of said surfactant.

6. The solution of claim 5 in which the acid is hydroxyacetic acid.

7. The solution of claim 6 in which the amine is monoethanol amine.

8. The solution of claim 7 in which the glycol ether is ethylene glycol mono butyl ether.

9. A washing solution concentrate dilutable with water to form a washing solution for removing flux from circuit boards, said concentrate consisting essentially of:

| | |
|---|---|
| Ethylene glycol mono butyl ether | 20% |
| Monoethanol amine | 20% |
| A water soluble polyoxyethylene surfactant | 1% |
| Isopropyl alcohol | 5% |
| Hydroxyacetic acid | 3.75% |
| Water | Balance. |

* * * * *